US012215908B1

United States Patent
Primbas

(10) Patent No.: US 12,215,908 B1
(45) Date of Patent: *Feb. 4, 2025

(54) AIR CONDITIONING SYSTEM AND TRANSPORTATION SYSTEM INCLUDING SAME

(71) Applicant: Thevu LLC, Concord Township, OH (US)

(72) Inventor: George Primbas, Concord Township, OH (US)

(73) Assignee: THEVU LLC, Concord Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,006

(22) Filed: Aug. 27, 2024

Related U.S. Application Data

(63) Continuation-in-part of application No. 18/612,010, filed on Mar. 21, 2024, now Pat. No. 12,103,354.

(60) Provisional application No. 63/559,466, filed on Feb. 29, 2024.

(51) Int. Cl.
| | |
|---|---|
| *F25B 9/06* | (2006.01) |
| *F24F 5/00* | (2006.01) |
| *F25B 9/00* | (2006.01) |
| *F25B 43/00* | (2006.01) |

(52) U.S. Cl.
CPC .............. *F25B 9/06* (2013.01); *F24F 5/0085* (2013.01); *F25B 43/00* (2013.01); *F25B 9/004* (2013.01)

(58) Field of Classification Search
CPC . F25B 9/004; F25B 9/06; B60L 8/006; B64D 2013/0611; B64D 2013/0644
See application file for complete search history.

(56) References Cited

U.S. PATENT DOCUMENTS

| | | | |
|---|---|---|---|
| 2,304,151 A | 12/1942 | Robert | |
| 2,800,002 A * | 7/1957 | Seed | B64D 13/06 |
| | | | 62/402 |
| 4,546,939 A | 10/1985 | Cronin | |
| 4,550,573 A | 11/1985 | Rannenberg | |
| 5,036,678 A | 8/1991 | Renninger | |
| 5,317,904 A | 6/1994 | Bronicki | |
| 5,701,755 A | 12/1997 | Severson | |
| 5,709,103 A | 1/1998 | Williams | |
| 5,722,229 A | 3/1998 | Provost | |
| 6,526,775 B1 * | 3/2003 | Asfia | B64D 13/06 |
| | | | 62/401 |

(Continued)

*Primary Examiner* — Christopher R Zerphey
(74) *Attorney, Agent, or Firm* — The Powers IP Law Firm

(57) ABSTRACT

An air conditioning system is provided. The air conditioning system includes an air compressor, a battery, a generator, a blower, and a turboexpander. The air compressor generates pressurized air from ambient air. The battery is for powering the air compressor motor. The generator is electrically connected to the battery. The turboexpander includes a drive shaft, a turbine wheel coupled to the drive shaft, and an expander coupled to the drive shaft. The pressurized air provides a source of kinetic energy to directly cause the turbine wheel to rotate and generate boosted air from the pressurized air, and the boosted air from the turbine wheel is configured to be received in the expander wheel and directly cause the expander wheel and the drive shaft to rotate together with the turbine wheel, thereby generating expanded and cooled air in the expander wheel.

19 Claims, 3 Drawing Sheets

(56) References Cited

U.S. PATENT DOCUMENTS

| | | | |
|---|---|---|---|
| 6,735,951 B2 | 5/2004 | Thompson | |
| 7,222,499 B2 | 5/2007 | Hunt | |
| 7,871,038 B2 | 1/2011 | Space | |
| 8,935,928 B2 * | 1/2015 | Mills | F25B 27/00 |
| | | | 62/500 |
| 9,464,638 B2 | 10/2016 | Cepeda-Rizo | |
| 9,650,941 B2 | 5/2017 | Zhou | |
| 9,926,936 B2 | 3/2018 | Crisp | |
| 11,142,040 B2 | 10/2021 | Pursifull | |
| 11,535,392 B2 * | 12/2022 | LaTulipe | F02B 39/06 |
| 11,603,795 B2 | 3/2023 | Katsumata | |
| 11,802,489 B1 * | 10/2023 | Spierling | F02C 6/14 |
| 12,103,354 B1 * | 10/2024 | Primbas | B60H 1/00392 |
| 2011/0239659 A1 | 10/2011 | Lior | |
| 2018/0340713 A1 | 11/2018 | Dowdy, III | |
| 2019/0309997 A1 | 10/2019 | Fletcher | |
| 2020/0189397 A1 | 6/2020 | Mangum | |
| 2023/0036416 A1 | 2/2023 | Desantes Fernandez | |

* cited by examiner

AIR CONDITIONING SYSTEM AND TRANSPORTATION SYSTEM INCLUDING SAME

CROSS REFERENCE TO RELATED APPLICATIONS

This application is a continuation-in-part of U.S. patent application Ser. No. 18/612,010, filed Mar. 21, 2024, and entitled "AIR CONDITIONING SYSTEM, TRANSPORTATION SYSTEM INCLUDING THE SAME, AND ASSOCIATED METHOD", which claims priority to and claims the benefit of U.S. Patent Application Ser. No. 63/559,466, filed Feb. 29, 2024, the contents of which are incorporated herein in by reference.

BACKGROUND

Air conditioning (A/C) systems have been known for many years. Generally, it can be said that A/C systems provide cooled air into an environment (e.g., a residential or commercial building) by removing heat from indoor air. As the A/C system is performing this function, it returns the cooled air to the indoor space, and expels hot air outside of the building. Today, known A/C systems use a coolant, such as freon, ammonia, propane, and the like, and circulates this coolant to generate the cooled air. Furthermore, today's A/C systems, such as the prior art A/C system 2 of FIG. 1, include a compressor 4, a condenser 6, and an evaporator 8. In operation, these components of the A/C system work to change the coolant from gas to liquid and back to a gas.

More specifically, the compressor 4 increases the pressure and temperature of the coolant gas and delivers it to the condenser 6, where it is converted to a liquid, before it is sent back to the evaporator 8. In the evaporator 8, the liquid coolant (e.g., freon, ammonia etc.) evaporates and cools the coil of the evaporator 8. Subsequent to this cooling of the coil of the evaporator 8, a fan 10 blows air across the cold coil of the evaporator 8 in order to cool the building (e.g., residence, commercial, or otherwise). Additionally, after being blown into the building, the cooled air is then circulated throughout the building while the heated evaporated gas is sent back outside the compressor. In other words, the A/C system 2 is a closed loop system, and as such, the heat is then released into the outdoor air as the coolant returns to a liquid state. In operation, this sequence is repeated until the building reaches a desired temperature.

The above-described system/process has a number of drawbacks. First, coolant in A/C systems, such as freon (e.g., refrigerant), is becoming more and more regulated. As a result, the coolant is becoming extremely expensive and inefficient for users, who may be homeowners or commercial building owners, to use in their A/C systems. Second, performing maintenance on today's A/C systems is rather difficult. For example, maintenance technicians who have to replace coolant of a given A/C system with new coolant are forced to turn off an entire A/C system, syphon out the old coolant, and introduce the new coolant. This process can take significant time to perform, costing users money. Third, because the cost of various coolants has gotten so high, owners are often forced to replace entire A/C systems when they have leaks in their coils, rather than simply introduce new coolant. This is not desirable. Fourth, because coolant and today's A/C systems (e.g., evaporators and condensers) are so expensive, many places in the world, such as hot desert regions, are unable to afford the same, thereby making withstanding the heat rather difficult. Fifth because powering air compressors requires users to draw power from a power grid, regions of the world with less sophisticated electric power capabilities are undesirably deprived of air conditioning. Finally, because today's A/C systems are closed loop systems, users are forced to keep their windows and doors closed, in order to prevent cooled air from escaping, and/or to minimize A/C bills.

Other systems which cause gases to move between states, besides the A/C system 2, include air separation systems at air separation plants. These systems have been known for a long time. However, the primary purpose of most all if not all air separation systems at these plants is to liquify gases (e.g., nitrogen, oxygen, etc.) for refrigeration purposes. Accordingly, equipment in these plants is uniquely tailored for the purpose of, for example, liquifying oxygen and nitrogen. Furthermore, gases in such plants, such as nitrogen gas, are lethal if breathed in by a human.

It is with respect to these and other considerations that the instant disclosure is concerned.

SUMMARY

In one aspect of the disclosed concept, an air conditioning system is provided. The air conditioning system includes an air compressor, a battery, a generator, a blower, and a turboexpander. The air compressor generates pressurized air from ambient air. The battery is for powering the air compressor motor. The generator is electrically connected to the battery. The turboexpander includes a drive shaft, a turbine wheel coupled to the drive shaft, and an expander coupled to the drive shaft. The pressurized air provides a source of kinetic energy to directly cause the turbine wheel to rotate and generate boosted air from the pressurized air, and the boosted air from the turbine wheel is configured to be received in the expander wheel and directly cause the expander wheel and the drive shaft to rotate together with the turbine wheel, thereby generating expanded and cooled air in the expander wheel.

In another aspect, a transportation system including an electric motor and the aforementioned air conditioning system is provided.

DETAILED DESCRIPTION

Figure 1:
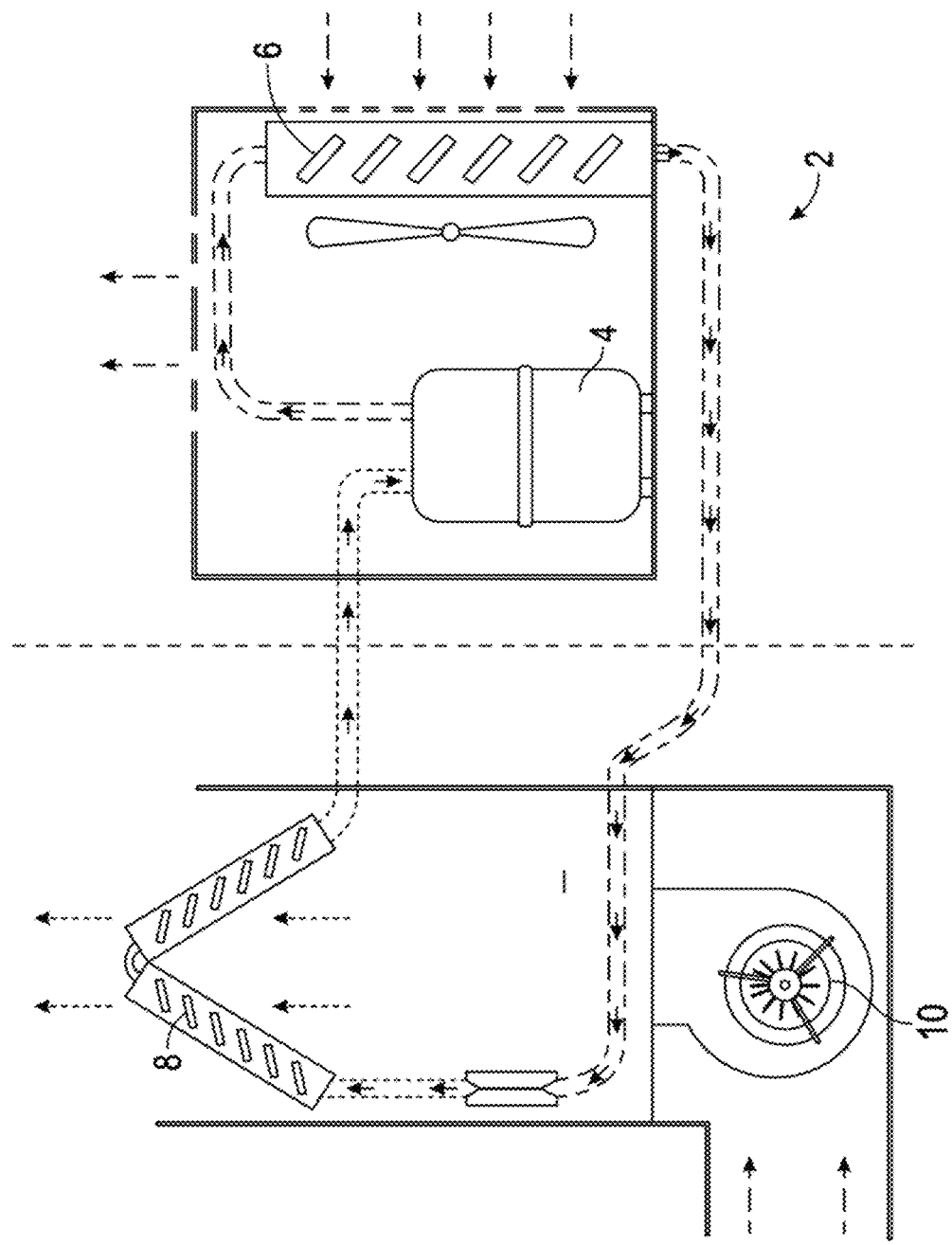
FIG. 1 is a schematic of a prior art A/C system.

As employed herein, the term "coupled" shall mean connected together either directly or via one or more intermediate parts or components.

As employed herein, the term "number" shall mean one or an integer greater than one (i.e., a plurality).

As employed herein, the term "air compressor" shall mean a device which generates pressurized air from ambient air, and delivers the pressurized air at an outlet at a pressure greater than the pressure of the ambient air entering the inlet. Air compressors in accordance with the disclosed concept may use electrical energy in order to generate a flow of pressurized gas. Air compressors may include an electric air compressor motor. Air compressors in accordance with the disclosed concept, unlike nitrogen compressors (or compressors configured for other gases besides air), may not have gas coolers, inlet and outlet dampers, and asynchronous motors.

As employed herein, the term "blower" shall mean an apparatus configured to produce air movement to a space. Blowers in accordance with the disclosed concept include propeller fans, centrifugal fans, vane-axial fans, and tube-axial fans.

As employed herein, the term "generator" shall mean a device configured to convert mechanical energy obtained from an external source into electrical energy as an output. Generators in accordance with the disclosed concept convert mechanical energy from rotation of a drive shaft of a turboexpander into electrical energy, and may do so by moving at least one electrical conductor in a magnetic field in order to create a voltage difference between two ends of the electrical conductor.

As employed herein, the term "coolant" shall mean a substance configured to change states between liquid and gas, and as employed in a coil of an evaporator of an A/C system, such as the A/C system 2. Non-limiting examples of coolants include freon, propane, and ammonia.

As used herein, the term "air" shall mean an atmospheric gas comprised of Nitrogen, Oxygen, and Argon. Air in accordance with the disclosed concept includes indoor and outdoor air, as well as both purified and non-purified air, wherein purified air includes, but is not limited to, air in which moisture and/or carbon dioxide have been removed. In one non-limiting example, air in accordance with the disclosed concept is non-toxic (e.g., breathable) to human beings.

As employed herein, the term "valve" shall mean a device for causing an opening area of a region of a conduit to be changeable as the valve opens and closes. Valves in accordance with disclosed concept include guide vanes, as well as devices which move between FULLY OPEN states and FULLY CLOSED states.

As employed herein, the terms "inlet" and "outlet" shall each correspond to a "conduit", whether a metallic or non-metallic pipe, or other type of conduit.

As employed herein, the term "control system" shall mean a system for directing the flow of air in an air conditioning system by causing any number of valves to independently move to predetermined positions, including fully open positions, fully closed positions, and positions therebetween. Control systems in accordance with the disclosed concept include programmable logic control systems.

As employed herein, the phrase "combustion reaction involving burning of fuel" shall mean a reaction involving an explosion between a gas, such as air, and a combustible fuel (e.g., oil including byproducts such as gasoline and aviation fuel, and natural gas including byproducts such as hydrogen fuel). A "combustion reaction involving burning of fuel" does not include the discharge of energy from a battery and associated powering of an air compressor motor therewith.

As employed herein, the phrase "sole source of kinetic energy" shall mean a source of kinetic energy, such as a flow of pressurized air, in whose absence another object, such as a turbine wheel of a turboexpander, is configured to be in a static state (e.g., at rest), with respect to a ground.

Figure 2:
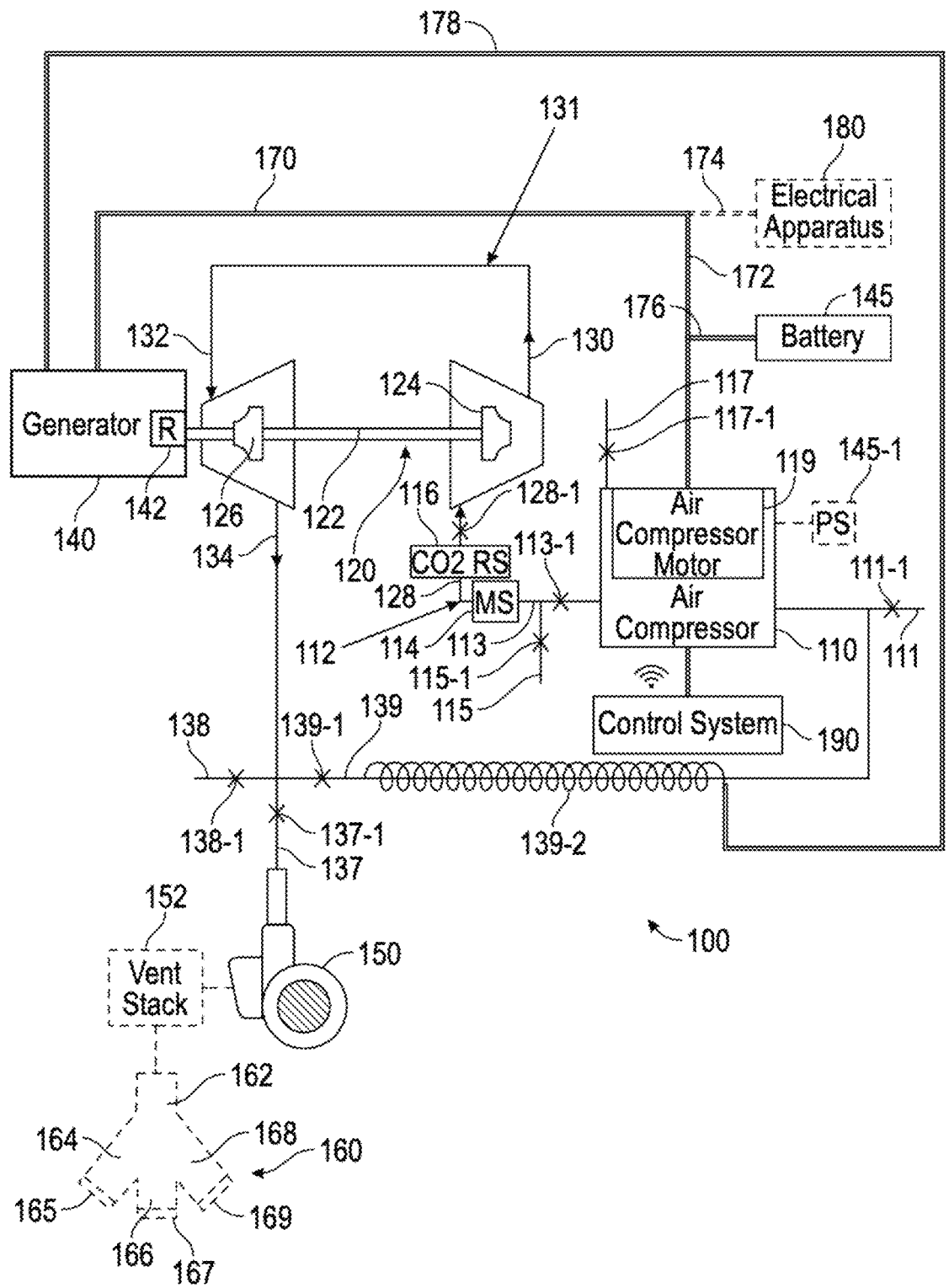
FIG. 2 is a simplified view of an A/C system in accordance with the disclosed concept, shown as employed with an electrical apparatus, an additional power source, a vent stack, and ductwork, each of which is illustrated in dashed line drawing, and wherein double line connections between components in FIG. 2 denote electrical connections and single line connections between components in FIG. 2 generally denote conduits (e.g., without limitation, pipes) through which fluids may flow.

FIG. 2 shows an example A/C system 100, in accordance with one non-limiting embodiment of the disclosed concept. The A/C system 100 in one example is preferably a coolant-free air conditioning system such that it functions without circulating coolant into a coil of an evaporator or other device. This is highly beneficial, as compared to the A/C system 2 (FIG. 1), which is required to use coolant to cool buildings and the like. More specifically, by being coolant-free, the A/C system 100 can, among other advantages, save users money and minimize maintenance. That is, large evaporators and the like do not have to be replaced, and expensive coolant does not have to be employed in order to cool a building.

The A/C system 100 will now be discussed in detail, and the aforementioned advantages as well as others will be made apparent. As shown in FIG. 2, the system 100 includes an air compressor 110, a turboexpander 120, a generator 140 coupled to the turboexpander 120, a battery 145 electrically connected to the generator 140, and a blower 150. The turboexpander 120 is coupled to the air compressor 110, the generator 140, and the blower 150. In one non-limiting example, the A/C system 100 is configured to deliver expanded and cooled air to ductwork 160, which may be coupled to the blower 150 and configured to deliver the expanded and cooled air from the turboexpander 120 throughout a building.

In operation, aspects of the A/C system 100 comprising the air compressor 110, the turboexpander 120, the generator 140, the battery 145, and the blower 150 may be located outside of a building, and may be fluidly coupled to the ductwork 160, which may extend throughout the interior of the building. In a suitable alternative example, the air compressor 110, the turboexpander 120, the generator 140, and the blower 150 may all be located in an interior of a building and be a self-contained subassembly that is configured to pull indoor air into the air compressor 110 for cooling, wherein the cooled air may be delivered back into the indoor environment.

The turboexpander 120 includes a drive shaft 122, a turbine wheel 124 coupled to the drive shaft 122, an expander wheel 126 coupled to the drive shaft 122 and the turbine wheel 124 (e.g., via the drive shaft 122), a first inlet 128 and a first outlet 130 each associated with the turbine wheel 124, and a second inlet 132 and a second outlet 134 each associated with the expander wheel 126. Furthermore, as shown, the generator 140 includes a rotor ("R") 142 coupled to the drive shaft 122 of the turboexpander 120 and configured to be rotated during operation of the turboexpander 120.

Moreover, the air compressor 110 may include an air compressor motor 119, which may be an electric motor. Additionally, the generator 140 is preferably electrically connected to the air compressor motor 119 in order to power the air compressor 110, and/or is configured to be electrically connected to an electrical apparatus 180 (shown in dashed line drawing in FIG. 2) in order to power the electrical apparatus 180. The electrical apparatus 180 may be an operating system of a building (e.g., a restaurant, hospital, and the like), such as a lighting system, refrigeration system, freezer system, etc., in a manner wherein the A/C system 100 is configured to deliver air conditioning to the building, and also supply power to the lighting, refrigeration, and/or freezer system, as well as various other systems within the building. Furthermore, the generator 140 may be configured to power, e.g., fully power, the electrical apparatus 180 (e.g., the operating system of the building) while the blower 150 is delivering the expanded and cooled air to the building. After discussion of the operation of the A/C system 100, below will be discussion of an example implementation of the A/C system 100, wherein an electrical apparatus is in the form of an electric motor 280 (FIG. 4) of a transportation system (e.g., vehicle 200, shown in FIGS. 3 and 4), such that the vehicle 200 includes the A/C system 100 as an integral operating system.

Continuing to refer to FIG. 2, the battery 145 is electrically connected to the air compressor motor 119, the generator 140, and the electrical apparatus 180. Additionally, in non-limiting examples of the disclosed concept, the A/C system 100 does have the capability to receive power from a grid (e.g., from a power source 145-1, shown in dashed line drawing in FIG. 2), should the need arise.

In operation, the generator 140 reliably supplies power to a number of devices. For example, the battery 145 is electrically connected to and configured to be charged by the generator 140 of the A/C system 100. Moreover, the battery 145 is also configured to power the air compressor motor 119. Specifically, during operation of the A/C system 100, power may first be drawn by the air compressor motor 119 from the battery 145.

In one non-limiting example, the A/C system 100 further includes a moisture separator ("MS") 114, which may be a filter, fluidly coupled to an outlet 113 of the air compressor 110 and the first inlet 128 of the turboexpander 120 in order for moisture (e.g., water) to be removed from the pressurized air before the pressurized air is delivered to the turboexpander 120. As such, the air compressor 110 may be configured to pull in ambient air at an inlet 111 of the air compressor 110 from the atmosphere, generate pressurized air from the ambient air, and cause the pressurized air to exit via the outlet 113 before being passed through the moisture separator 114. It will be appreciated that the ambient air may be pressurized to any number of different pressure ranges, depending on the environment for the A/C system 100. In one example, the ambient air is pressurized to between 130-180 psi. In an alternative example, an air compressor is configured to generate higher or lower pressures higher than 130-180 psi, provided suitable materials are employed, such as thicker and higher-grade steels for higher pressures.

Continuing to refer to FIG. 2, it will be appreciated that the air compressor 110 may, in one example, be fluidly coupled to the turboexpander 120 without any intermediate air processing apparatuses (e.g., a heat exchanger, distillation column, etc.) therebetween, such that the pressurized air flows directly from the air compressor 110 into the turboexpander 120. As used herein, the moisture separator 114 is not considered an air processing apparatus. In a further example, the outlet 113 of the air compressor 110 is directly coupled to and engaged with the first inlet 128, such that air flows directly from the outlet 113 through the moisture separator 114 and into the first inlet 128 of the turboexpander 120, without passing through any other intermediate parts or components. It will also be appreciated that the blower 150 may be fluidly coupled to the second outlet 134 without any intermediate air processing apparatuses (e.g., a heat exchanger, distillation column, etc.) being located therebetween. In other words, the blower 150 may have an inlet 137 that is directly coupled with and engaged with the second outlet 134.

In one example, a suitable alternative air compressor (not shown) may be fluidly coupled to the first inlet 128 of the turboexpander via a side stream 115, shown in FIG. 2. In such an embodiment, the alternative air compressor (not shown) may be an existing air compressor at a garage, air separation facility, or the like. In such an example embodiment of the disclosed concept, the side stream 115, and a valve 115-1 coupled to the side stream 115, may be one of a plurality of streams of the air compressor (not shown), wherein other of the streams may separately be configured to be directed to, for example, a fork-lift (not shown) in a garage or other location. Accordingly, it will be appreciated that air from the alternative air compressor (not shown) may likewise not be processed (e.g., in a heat exchanger, distillation column, or the like) when passing through the valve 115-1 of the side stream 115 to the first inlet 128. Furthermore, in such an example of the disclosed concept, an air conditioning system preferably includes the turboexpander 120, the generator 140, the battery 145, and the blower 150, which are configured to receive the pressurized air from the separate air compressor (not shown) via the side stream 115 and valve 115-1.

Continuing to refer to FIG. 2, coupled to the outlet 113 of the air compressor 110 is a valve 113-1, and coupled to the first inlet 128 of the turboexpander 120 is another valve 128-1. In operation, the valves 113-1,128-1 function to control the volume and speed of air both exiting the air compressor 110 and entering the first inlet 128 of the turboexpander 120. As a result, volume flow of air moving through the A/C system 100 is configured to be reliably controlled by opening and closing the valves 113-1,128-1.

More specifically, the A/C system 100 may further include a control system 190. In one example, the control system 190 is wirelessly connected and/or electrically connected to the air compressor 110 and the valves 113-1,128-1, such that responsive to actuation of the control system 190 (e.g., wherein a user presses a button on a control panel or sends a signal to the control system 190 with a wireless device), the air compressor 110 is configured to generate the pressurized air at a predetermined first pressure, thereby causing the turboexpander 120 to generate expanded and cooled air at a predetermined second temperature. This is achieved by the valves 113-1,128-1 being opened and closed to predetermined opening areas by the control system 190.

Once inside the turboexpander 120, the turbine wheel 124 may generate boosted air from the pressurized air from the air compressor 110, and the expander wheel 126 may generate expanded and cooled air from the boosted air, as will be discussed below. For example, the turbine wheel 124 boosts the pressurized air from the air compressor 110 to an even greater pressure. As such, by employing the turbine wheel 124, a size of the air compressor 110 is advantageously able to be relatively small. In one example, the turbine wheel 124 receives the pressurized ambient air at 130-180 psi and boosts the pressurized ambient air to a pressure even greater than 180 psi. After being boosted by the turbine wheel 124, the even higher pressurized air exits the turbine wheel 124 via the first outlet 130, which is fluidly coupled to the second inlet 132 of the expander wheel 126.

Accordingly, after exiting through the first outlet 130, the boosted air enters the expander wheel 126 via the second inlet 132. Once inside the expander wheel 126, the boosted air is expanded by volume, which causes a relatively large pressure and temperature drop in the air. In other words, the expander wheel 126 generates expanded and cooled air from the boosted air. In one example, the air is configured to exit the turboexpander at between 3-20 psi of pressure, as well as between 33-45 degrees Fahrenheit. It will be appreciated that inlet and outlet temperatures associated with the turboexpander 120 may readily be varied.

However, in accordance with the disclosed concept, air is preferably not being liquified during operation of the A/C system 100 (e.g., other than at the moisture separator 114), and operation of the A/C system 100 includes directing the air above a freezing temperature of water. That is, the air compressor 110 and the turboexpander 120 are together configured to change the ambient air to the expanded and cooled air without causing any of the ambient, pressurized, boosted, and expanded and cooled air to change states between a gas and a liquid. This includes embodiments where air undergoes a purification process corresponding to moisture and carbon dioxide being removed from the air between the air compressor 110 and the first inlet 128.

Furthermore, it will be appreciated that the gas which is compressed by the air compressor 110 and the turbine wheel 124, and then expanded and cooled by the expander wheel 126, is the same gas which is delivered to the blower 150. That is, unlike existing systems (e.g., the A/C system 2) in which coolant changes from liquid to gas in the evaporator in order to cool an entirely separate and distinct gas (e.g., air) which is passed over the coil of the evaporator, the A/C system 100 is preferably coolant-free. As such, the same air which is pressurized, boosted, and expanded and cooled is also the air that is delivered to the blower 150, such that the blower receives the expanded and cooled air in order to deliver the expanded and cooled air to an environment. Put another way, substantially all of the air associated with the A/C system 100 enters and passes through each of the compressor 110, the turboexpander 120, and the blower 150 such that coolant (e.g., being located in coils) is preferably not employed to cool the air. As such, the A/C system 100 readily provides tremendous advantages over the prior art A/C system 2 (FIG. 1) and improves over the prior art A/C system 2 in most and/or all of the respects discussed above in connection with the A/C system 2 (FIG. 1).

Continuing to refer to FIG. 2, as the expander wheel 126 is dropping the pressure and temperature of the air, the drive shaft 122 is rotating, which in turn powers the windings of the generator 140 via the coupling between the rotor 142 and the drive shaft 122. The purpose of this functionality will be described below. Additionally, once the pressure and temperature of the air have been dropped by the expander wheel 126, the expanded and cooled (e.g., and also low pressure) air is caused to exit the turboexpander 120 via the second outlet 134. In turn, this cool and low-pressure air is advantageously used to cool a building, the cabin of the vehicle 200 (FIGS. 3 and 4), and/or other environments. More specifically, and continuing to refer to FIG. 2, the inlet 137 of the blower 150 is fluidly coupled to the second outlet 134. As such, when the cool and low-pressure air is received at the blower 150, a fan of the blower 150 can cause that cool and low-pressure air to be excited (e.g., made more turbulent), thereby allowing it to be delivered more effectively to a building.

Furthermore, because the air is rather cold, in one example the A/C system 100 is configured to be employed with a valve system in the form of a vent stack 152 coupled to the outlet of the blower 150. The vent stack 152 may open and close to an outside environment automatically or from a user. In one example, the control system 190 is wirelessly connected to the vent stack 152 in order to better control the temperature of cooled air being delivered to a building. For example, a smaller opening of the vent stack 152 via the control system 190 is configured cause colder temperatures in a given building. Accordingly, the vent stack 152 may be a way for the A/C system to regulate temperature in a building. In one example, the vent stack 152 could be open one at an initial time one hundred percent and then can close in a gradual manner in order to efficiently regulate temperature in a building.

Continuing to refer to FIG. 2, the ductwork 160, which is coupled to the A/C system 100, may include a primary branch 162 and a plurality of secondary branches 164,166, 168 fluidly coupled to the primary branch 162. Additionally, coupled to, located on, and/or provided with an end of each of the secondary branches 164,166,168 may be a corresponding vent 165,167,169 (e.g., one which may be positioned adjacent a wall of a room of a commercial building or house). As such, it will be appreciated that the cool and low-pressure air, which has been excited by the blower 150, will enter the primary branch 162 (e.g., the primary branch 162 is fluidly coupled to the blower 150) and be forced through each of the secondary branches 164,166,168, where it will exit the ductwork 160 through the corresponding vents 165,167,169, thereby adequately delivering the cooled and low-pressure air throughout a large number of regions of a building.

In addition to delivering cooled and low-pressure air to an environment, the A/C system 100 is also provided with a power generation capability in tandem with the air conditioning capability. More specifically, as stated above, as the drive shaft 122 of the turboexpander 120 is caused to rotate, the rotor 142 of the generator 140 is rotated, thus generating power. As shown in FIG. 2, a first electrical line 170 is electrically connected to the generator 140, and a number of branch electrical lines 172,174,176 are each directly or indirectly electrically connected to the first electrical line 170. In one example, the electrical lines 170,172,174,176 allow electrical power from the generator 140 to be directed to any combination or all of the air compressor motor 119, the battery 145, and the electrical apparatus 180.

In one example, electric power from the generator 140 is directed back into the air compressor motor 119 via the electrical lines 170,172, which may be one single electrical line. In another example, the A/C system 100 further is configured to deliver power to the electrical apparatus 180, wherein electric power from the generator 140 is directed to the electrical apparatus 180 via the electrical lines 170,174, which may be one single electrical line. In yet a further example, electric power from the generator 140 is directed to the battery 145 via the electrical lines 170,172,176, which may be one single electrical line, in order that the battery 145 may be charged by the generator 140. Accordingly, the A/C system 100, unlike the A/C system 2 (FIG. 1), is advantageously configured to deliver cool and low-pressure air to an environment and simultaneously (e.g., at the same time) deliver electric power to electrical apparatuses, including the air compressor motor 119, the battery 145, and/or the electrical apparatus 180.

Continuing to refer to FIG. 2, the air compressor 110 includes the inlet 111 for receiving the ambient air, and the inlet 137 of the blower is configured to receive the expanded and cooled air from the second outlet 134 of the turboexpander 120. Furthermore, as shown in FIG. 2, the A/C system 100 further includes a recirculation conduit 139 fluidly coupled to each of the second outlet 134 of the turboexpander 120, the inlet 137 of the blower 150, and the inlet 111 of the air compressor 110 in order to recirculate a first amount of the expanded and cooled air back into the inlet 111 of the air compressor after the first amount has exited the turboexpander 120. In one example, the air compressor 110 is fluidly coupled between the recirculation conduit 139 and the turbine wheel 124 such that the first amount is configured to flow directly from the recirculation conduit 139 into the inlet 111 of the air compressor 110 to be pressurized before flowing into and being boosted by the turbine wheel 124. In other words, the recirculation conduit 139 is preferably spaced from the inlet 128 associated with the turbine wheel 124.

To illustrate, and with continued reference to FIG. 2, the A/C system 100 may further include a vent conduit 138, as well as a plurality of valves 111-1,137-1,138-1,139-1 each coupled to a corresponding one of the inlet 111 of the air compressor 110, the inlet 137 of the blower 150, the vent conduit 138, and the recirculation conduit 139. The valves 111-1,137-1,138-1,139-1 are preferably each wirelessly connected and/or electrically connected to the control system 190, and function to control the flow of the expanded and cooled air in the system. For example, responsive to actuation of the control system 190, the valve 138-1 may move between fully open and fully closed states, thus causing either large amounts or none, respectively, of the expanded and cooled air to exit the A/C system to an atmosphere via the vent conduit 138. Similarly, the valves 137-1,139-1, 111-1 control airflow into the blower 150, through the recirculation conduit 139, and into the air compressor 110.

In one example, the valves 137-1,139-1 function to control the first amount of the expanded and cooled air flowing into the inlet 111 of the air compressor 110 and a second amount of the expanded and cooled air flowing into the blower 150. In one example, the vent conduit 138 is fluidly coupled to each of the second outlet 134 of the turboexpander 120, the inlet 137 of the blower 150, and the recirculation conduit 139, such that the vent conduit 138 is configured to vent a second amount of the expanded and cooled air to an atmosphere. It will thus be appreciated that the valve 138-1 is configured to control the second amount of the expanded and cooled air being vented to the atmosphere. In one example, responsive to actuation of the control system 190, such as a user pressing a button on the control system 190 or the control system 190 receiving a signal from a smart device (e.g., mobile phone, tablet, vehicle, etc.), the amount of the expanded and cooled air passing through the recirculation conduit 139 may be a predetermined amount.

Continuing to refer to FIG. 2, the air compressor is further configured to startup in a reliable manner. More specifically, the air compressor 110 preferably further includes a vent conduit 117, the outlet 113, a valve 117-1 coupled to the vent conduit 117, and the valve 113-1 coupled to the outlet 113 of the air compressor 110. Furthermore, the vent conduit 117 is configured to vent an amount of the pressurized air to an atmosphere, and the valve 117-1 is configured to control the amount of the pressurized air being vented to the atmosphere. Moreover, the valve 113-1 is configured to control an amount of the pressurized air exiting the air compressor 110 before being delivered to the turboexpander 120. In turn, responsive to the A/C system 100 moving from an INITIAL STATE to an OPERATING state, the amount of pressurized air vented to the atmosphere decreases as the amount of air passing through the outlet 113 increases. Put another way, the vent conduit 117 may close gradually or entirely after the air compressor 110 gets going, in order to allow for maximum delivery of the pressurized air to the turboexpander 120.

Figure 3:
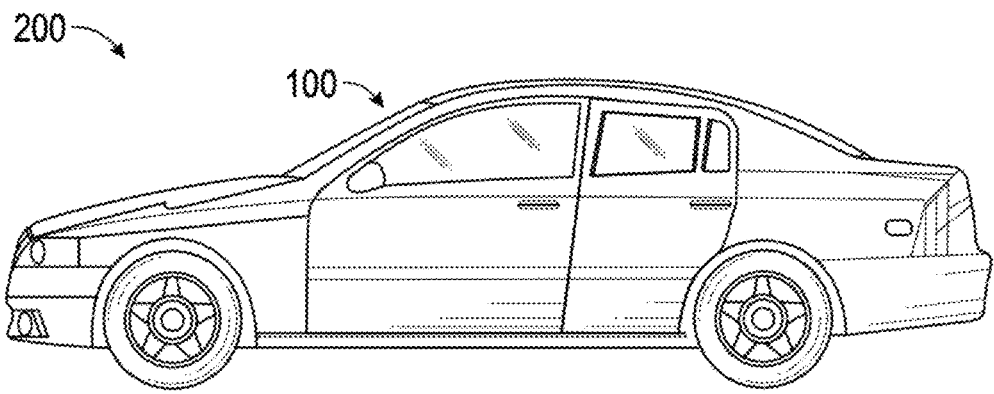
FIGS. 3 and 4 are front and simplified views, respectively, of a transportation system including the A/C system of FIG. 2, in accordance with one non-limiting embodiment of the disclosed concept.
Figure 4:
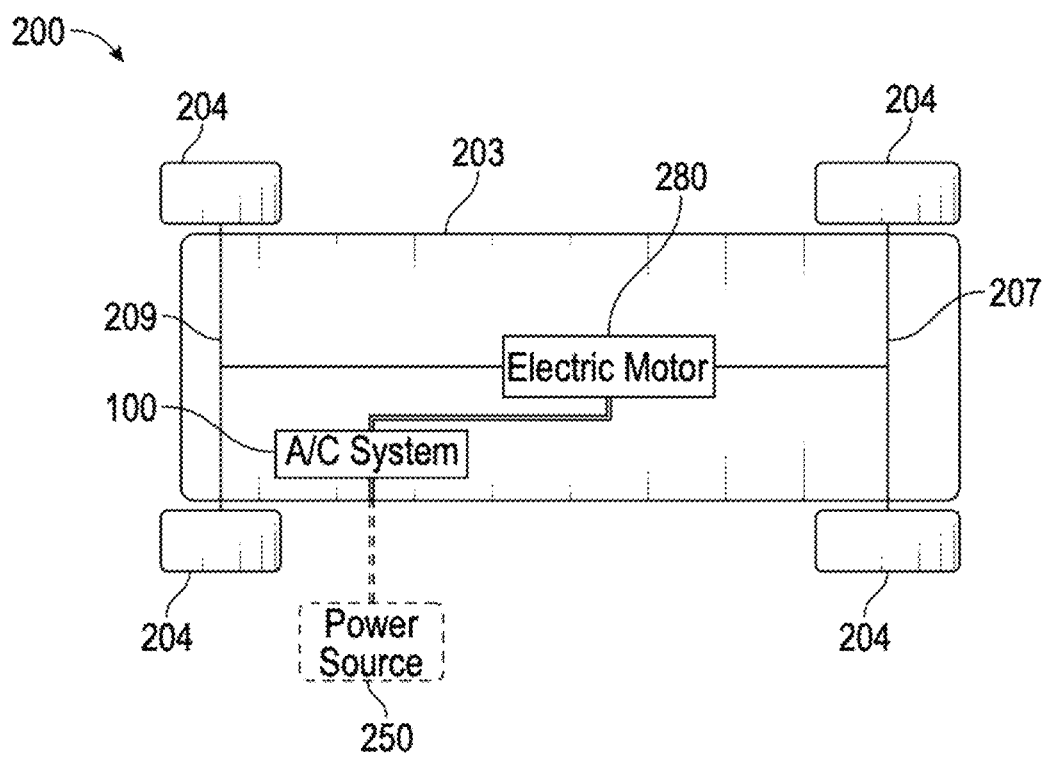

In another example embodiment of the disclosed concept, and as shown in FIGS. 3 and 4, the vehicle 200 includes the A/C system 100, a vehicle body or frame 203, a pair of wheels 204, at least one element (e.g., first and second axles 207,209) each coupled to the frame 203 as well as to one of the pair of wheels 204, and an electrical apparatus in the form of the electric motor 280. In operation the electric motor 280 is configured to drive (e.g., cause to rotate) at least one of the first and second axles 207,209, thereby allowing the first, second, third and fourth wheels 204 to roll when the vehicle 200 is in an OPERATING state. Furthermore, the electric motor 280 is advantageously configured to draw power from each of the generator 140 (FIG. 2) and the battery 145 (FIG. 2).

Continuing to refer to FIG. 4, it will be appreciated that the generator 140 (FIG. 2) and the battery 145 of the A/C system 100 are each electrically connected to and configured to supply power to the electric motor 280. Accordingly, operation of the A/C system 100 as discussed above is configured to deliver cool air to an environment (e.g., a cabin of the vehicle 200) and also generate electric power in the generator 140 in order to charge the battery 145 as well as power the electric motor 280. As the electric motor 280 is powered by the generator 140 and/or the battery 145 (FIG. 2), the body or frame 203 and associated wheels 204 can thus be moved along a road, parking lot, or elsewhere. In other words, the vehicle 200 can be powered and caused to drive by the power from the generator 140 being delivered to the electric motor 280.

Additionally, in the example of FIG. 4 the battery 145 for powering the air compressor motor 119 may be configured to supply power to the electric motor 280 in the form of a backup power supply to the electric motor 280 and/or in order to start the electric motor 280. Accordingly, the generator 140 is configured to power the electric motor 280 and function as a power source during operation of the vehicle 200. As such, the vehicle 200 may be powered with either relatively little electric charging and/or filling up of a gas tank (for hybrid vehicles). That is, the generator 140 may significantly supplement the power capabilities of the vehicle 200.

More specifically, the vehicle 200 may have an OFF state corresponding to the vehicle 200 being turned off and not moving, an IDLING state corresponding to the vehicle 200 being turned on and not moving, and an OPERATING state corresponding to the vehicle 200 being turned on and moving. In one example, the electric motor 280 is configured to draw a first amount of power from the battery 145 (FIG. 2) in order to move the vehicle 200 from the OFF state to the IDLING state, That is, the battery 145 can get the vehicle 200 started, and then once the vehicle 200 is running, the generator 140 (FIG. 2) can charge the battery 145 (FIG. 2) as well as power the electric motor 280.

For example, when the vehicle 200 is in the OPERATING state, the electric motor 280 is configured to draw a second amount of power from the generator 140 (FIG. 2). In other words, the electric motor 280 may draw power from each of the battery 145 and the generator 140, and the generator 140 may be configured to power and charge the battery 145 during operation of the A/C system 100. It will also be appreciated that when the vehicle 200 moves from the IDLING state to the OPERATING state, the first amount of power from the battery 145 decreases as the second amount of power from the generator 140 increases.

Accordingly, the vehicle 200 is configured such that the battery 145 may be employed to start the vehicle 200, and during operation of the vehicle 200, more power may be drawn from the generator 140 than the battery 145. As such, when the vehicle 200 is in the OPERATING state, the first amount of power from the battery 145 is configured to be less than the second amount of power from the generator 140. As a result, the battery 145 may be substantially smaller than batteries associated with today's electric and hybrid vehicles, wherein these batteries (not shown) are typically required to be relatively large and expensive because they are mostly the sole power sources for the vehicles.

Furthermore, by employing the A/C system 100 in the vehicle 200, a tremendous cost and material savings to businesses and consumers can be realized. More specifically, known transportation systems which employ relatively large batteries can advantageously be provided with the relatively small battery 145 instead, due to the generator 140 harnessing energy from the air. As a result, the cost of the vehicle 200 can be relatively low, and the vehicle 200 can also operate in a clean-energy manner wherein material use associated with batteries can be largely minimized.

More specifically, in one example the air compressor 110 is configured to pull in ambient air having a first amount X1 of energy, the air compressor 110 is configured to add a second amount X2 of energy to the ambient air that is being pressurized therein via compression, and during expansion of the air in the expander wheel 126, energy is removed from the air, such that the expanded and cooled air may be generated for air conditioning. Simultaneously, the expander wheel 126 is configured to create mechanical work in the generator 140 in order to generate electricity for powering the air compressor 110 and/or an electrical apparatus (e.g., the electrical apparatus 180 or the electric motor 280). As a result, apart from any friction associated losses in the system, a first fraction of the (X1+X2) energy may be provided as the expanded and cooled air for air conditioning, and a second fraction, which may be a larger fraction, of the (X1+X2) energy may be routed back from the generator 140 in the form of electricity to the air compressor motor 119, the battery 145, and/or the electric motor 280.

Additionally, because warmer air has more energy than colder air, the air conditioning system 100 preferably further has a heating element (e.g., heating coil 139-2) coupled to the recirculation conduit 139. This is optimal for cold weather conditions. More specifically, the heating coil 139-2 is preferably electrically connected to the generator 140 via the electrical line 178 and is preferably configured to be powered by the generator 140 during operation of the air conditioning system 100. As a result, the vehicle 200 is optimally configured to be powered by the air conditioning system 100 in cold weather, where the energy from the air is relatively low, as well as warm weather, where the energy from the air is relatively high. That is, the expanded and cooled air entering the recirculation conduit 139 after exiting the second outlet 134 may be heated with the heating coil 139-2 as it is passed through the recirculation conduit 139, thus increasing an amount of energy supplied to the turboexpander 120 from the air compressor 110.

Additionally, as shown in FIG. 4, the battery 145 (FIG. 2) of the A/C system 100 may, if the need arises, also be separately charged by connecting the vehicle 200 to a power source 250, which may be a charging station or plug extending from a building to a charging port of the vehicle 200.

It will thus be appreciated that the electric motor 280 may be configured to consume a first amount of power per mile during use, and the generator 140 (FIG. 2) of A/C system 100 may be configured to deliver a relatively large fraction of the first amount of power to the electric motor 280. In one example, the first amount of power consumed by the electric motor 280 is between 150-400 watt-hours per mile (e.g., 0.15-0.4 kWh/mile) during use.

Additionally, by powering the electric motor 280 with the air conditioning system 100, operation of the vehicle 200 can be said to be safer than known methods of powering a vehicle. For example, accidents involving gasoline powered vehicles may result in fuel tanks exploding, accidents involving vehicles powered by relatively large batteries may result in non-dry portions of the relatively large batteries igniting, and more recent but known technologies involving liquid hydrogen to power a vehicle may be dangerous in that liquid hydrogen is often rather difficult to contain and work with. In accordance with the disclosed concept, by way of contrast, the air conditioning system 100 obviates these challenges by powering the vehicle 200, in one example, without an explosion between air (e.g., any of the ambient, pressurized, boosted, and expanded and cooled air) and other gases, liquids, or solids. Rather, the disclosed concept relies on a safe heat exchange between energy in the air and electricity.

Although the disclosed concept has been described in association with the transportation system being in the form of the vehicle 200, which is an automobile, it will be appreciated that suitable alternative transportation systems are within the scope of the disclosed concept, including non-sedan automobiles such as sports-utility-vehicles and trucks, as well as buses, trains, large or small ships, and the like, wherein each of these transportation systems may have an electric motor electrically connected to the A/C system 100, and elements coupled to and configured to be driven by the electric motor.

Accordingly, it will be appreciated that one method of delivering expanded and cooled air to an environment with the A/C system comprises the steps of pulling in ambient air and generating pressurized air from the ambient air, with the air compressor 110; delivering the pressurized air to a turboexpander 120 of the A/C system 100; generating boosted air with the turboexpander from the pressurized air from the air compressor 110; after the boosted air has been generated by the turboexpander 120, generating the expanded and cooled air from the boosted air with the turboexpander 120, and also creating mechanical work in a generator 140 of the air conditioning system 100 which is coupled to the turboexpander 120, in order to generate electricity for powering the air compressor 110 and/or an electrical apparatus 180; and at the blower 150, receiving the expanded and cooled air from the turboexpander 120 and delivering the expanded and cooled air to the environment.

It will also be appreciated that the method may further comprise providing with the air compressor 110 the inlet 111 for receiving the ambient air; providing with the turboexpander 120 the outlet 134 through which the expanded and cooled air exits the turboexpander 120; providing with the blower 150 an inlet for receiving the expanded and cooled air from the outlet 134 of the turboexpander 120; and providing the A/C system with a recirculation conduit 139 fluidly coupled to each of the outlet 134 of the turboexpander 120, the inlet 137 of the blower 150, and the inlet 111 of the air compressor 110; and recirculating a first amount of the expanded and cooled air back into the inlet 111 of the air compressor 110 after the first amount has exited the turboexpander 120. The method may further include powering the operating system (e.g., the electrical apparatus 180) of a building with the generator 140 while the blower 150 is delivering the expanded and cooled air to the interior of the building.

Referring again to FIG. 2, and also FIGS. 3 and 4 which include the A/C system 100, additional operation of the A/C system 100 will now be described. In one example, it will be appreciated that the turbine wheel 124 is coupled to the drive shaft 122 and is fluidly coupled to the air compressor 110 such that the pressurized air from the air compressor 110 is configured to be forced through a conduit 112 (e.g., wherein the conduit 112 includes the outlet 113 and the inlet 128, and may be a pipe, such as a closed pipe or continuous closed pipe, which has one single lumen extending from a first open end to a second open end) extending between the air compressor 110 and the turbine wheel 124, and into the turbine wheel 124, thereby providing a source of kinetic energy, optionally a sole source of kinetic energy, to directly cause the turbine wheel 124 to rotate and generate the boosted air from the pressurized air.

The conduit 112 is different than arrangements of known technologies in that it allows for the pressurized air to provide this source of kinetic energy. In accordance with the disclosed concept, the conduit 112 advantageously is configured to receive at least 98 percent of the pressurized air therethrough for delivery to the turbine wheel 124. Additionally, the air compressor 110 may be configured to discharge the pressurized air at a first pressure, and the pressurized air is preferably configured to be received at the turbine wheel 124 at a second pressure equal to at least 95 percent of the first pressure (e.g., due to the conduit 112).

Furthermore, and continuing to refer to FIG. 2, the expander wheel 126 is preferably coupled to the drive shaft 122 and fluidly coupled to both the turbine wheel 124 and the blower 150 such that the boosted air from the turbine wheel 124 is configured to be received in the expander wheel 126 and directly cause the expander wheel 126 and the drive shaft 122 to rotate together with the turbine wheel 124 (e.g., the drive shaft 122 and the wheels 124,126 all rotate at the same angular velocity), thereby generating expanded and cooled air in the expander wheel 126.

It will also be appreciated that the air conditioning system is configured such that the expander wheel 126 and the drive shaft 122 rotate together with the turbine wheel 124 via the pressurized air, and the mechanical work is created in the generator 140, without the turboexpander 120 being driven by a combustion reaction involving burning of fuel by an apparatus directly connected to the turboexpander 120 or by an apparatus indirectly connected thereto via intermediate components. For example, the pressurized air is configured to provide the source of kinetic energy to directly cause the turbine wheel 124 to rotate and generate the boosted air from the pressurized air without the pressurized air being mixed with fuel from a combustion reaction before being received in the turboexpander 120. As a result, it is contemplated that all of the pressurized, boosted, and expanded and cooled air are non-toxic to humans and are thus breathable. This is distinct from many known technologies employing turboexpanders, such as in airplanes, in which air is mixed with fuel for directly or indirectly driving the turboexpander. Additionally, it will be appreciated that the turboexpander 120 of the air conditioning system 100 is preferably not configured to be driven by any gases other than air.

Additionally, as stated above, the expander wheel 126 is configured to create mechanical work in the generator 140 responsive to rotation of the drive shaft 122 in order to generate electricity for charging the battery 145 and thereby powering at least one of the air compressor motor 119 and a separate electrical apparatus (e.g., the electric motor 280). Thus, the battery 145 is configured to be charged by recycled energy from both the battery 145 and the ambient air after the ambient air has been pressurized by the air compressor 110 and boosted by the turbine wheel 124.

Additionally, in one example the A/C system 100 includes desirable apparatus to allow the A/C system 100 to operate at relatively low temperatures. These apparatus include the moisture separator 114, discussed above, and a carbon dioxide removal system ("CO2 RS") 116. The moisture separator 114 is fluidly coupled to the conduit 112 and is configured to remove moisture from the pressurized air before the pressurized air is delivered to the turbine wheel 124, thereby allowing the A/C system 100 to generate the expanded and cooled air at a temperature below a freezing temperature of water. Moreover, the carbon dioxide removal system 116 is preferably coupled to the conduit 112 after the moisture separator 114 and is configured to remove carbon dioxide from the pressurized air after the moisture has been removed by the moisture separator 114, and before the pressurized air is delivered to the turbine wheel 124, thereby allowing the A/C system 100 to generate the expanded and cooled air at another temperature below a freezing temperature of carbon dioxide. Because the moisture separator 114 and the carbon dioxide removal system 116 are uniquely configured to allow the expanded and cooled air to exit the expander wheel 126 at low temperatures, these two elements also advantageously allow the A/C system 100 to operate with a relatively large pressure drop across the expander wheel 126.

Continuing to refer to FIG. 2, it will be appreciated that the A/C system 100 further includes an additional conduit 131, one including the outlet 130 associated with the turbine wheel 124 and the inlet 132 associated with the expander wheel 126, such that the conduit 131, which may be a pipe, preferably has a first open end at the turbine wheel 124, a second open end at the expander wheel 126, and a closed portion extending therebetween such that the pipe has one single lumen extending from at the turbine wheel 124 to at the expander wheel 126. As a result of the conduit 131, the boosted air is allowed to flow directly from the turbine wheel 124 into the expander wheel 130.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality can be separated or combined in blocks differently in various implementations of the disclosure or described with different terminology. These and other variations, modifications, additions, and improvements can fall within the scope of the disclosure as defined in the claims that follow.

What is claimed is:

1. An air conditioning system, comprising:
an air compressor comprising an air compressor motor configured to pull in ambient air and generate pressurized air from the ambient air;
a battery for powering the air compressor motor;
a generator electrically connected to the battery;
a blower; and
a turboexpander comprising:
a drive shaft coupled to the generator,
a turbine wheel coupled to the drive shaft and fluidly coupled to the air compressor such that the pressurized air from the air compressor is configured to be forced through a conduit extending between the air compressor and the turbine wheel, and into the turbine wheel, thereby providing a source of kinetic energy to directly cause the turbine wheel to rotate and generate boosted air from the pressurized air, and
an expander wheel coupled to the drive shaft and fluidly coupled to both the turbine wheel and the blower such that the boosted air from the turbine wheel is configured to be received in the expander wheel and directly cause the expander wheel and the drive shaft to rotate together with the turbine wheel, thereby generating expanded and cooled air in the expander wheel, wherein the turboexpander does not rotate due to a combustion reaction involving burning of fuel by an apparatus indirectly connected to the turboexpander via intermediate components, wherein the turboexpander does not rotate due to a combustion reaction involving burning of fuel by an apparatus directly connected to the turboexpander, wherein the expander wheel and the generator are configured to convert the source of kinetic energy to mechanical energy of the drive shaft, and then convert the mechanical energy of the drive shaft to electrical energy in the generator, in order to generate electricity for charging the battery and thereby powering at least one of the air compressor motor and a separate electrical apparatus, and wherein the blower is configured to receive the expanded and cooled air from the expander wheel and deliver the expanded and cooled air to an environment.

2. The air conditioning system according to claim 1, wherein the source of kinetic energy is a sole source of kinetic energy to directly cause the turbine wheel to rotate.

3. The air conditioning system according to claim 1, further comprising a moisture separator and a carbon dioxide removal system, wherein the moisture separator is fluidly coupled to the conduit and is configured to remove moisture from the pressurized air before the pressurized air is delivered to the turbine wheel, thereby allowing the air conditioning system to generate the expanded and cooled air at a temperature below a freezing temperature of water, and wherein the carbon dioxide removal system is fluidly coupled to the conduit after the moisture separator and is configured to remove carbon dioxide from the pressurized air after the moisture has been removed by the moisture separator and before the pressurized air is delivered to the turbine wheel, thereby allowing the air conditioning system to generate the expanded and cooled air at a temperature below a freezing temperature of carbon dioxide.

4. The air conditioning system according to claim 1, wherein the battery is configured to be charged by recycled energy from both the battery and the ambient air after the ambient air has been pressurized by the air compressor and boosted by the turbine wheel.

5. The air conditioning system according to claim 1, further comprising an additional conduit comprising an outlet associated with the turbine wheel and an inlet associated with the expander wheel, such that the additional conduit extends from at the turbine wheel to at the expander wheel, thus allowing the boosted air to flow directly from the turbine wheel into the expander wheel.

6. The air conditioning system according to claim 5, wherein the additional conduit comprises a pipe having a first open end at the turbine wheel, a second open end at the expander wheel, and a closed portion extending therebetween such that the pipe has a single lumen extending between the first and second open ends.

7. The air conditioning system according to claim 1, wherein the conduit comprises a pipe extending from at the air compressor to at the turbine wheel, and wherein the pipe is configured to receive at least 98 percent of the pressurized air therethrough for delivery to the turbine wheel.

8. The air conditioning system according to claim 7, wherein the air compressor is configured to discharge the pressurized air at a first pressure, and wherein the pressurized air is configured to be received at the turbine wheel at a second pressure equal to at least 95 percent of the first pressure.

9. The air conditioning system according to claim 1, wherein the air compressor comprises an inlet for receiving the ambient air, wherein the turboexpander further comprises an outlet through which the expanded and cooled air exits the expander wheel, wherein the blower has an inlet for receiving the expanded and cooled air from the outlet of the turboexpander, wherein the air conditioning system further comprises a recirculation conduit fluidly coupled to each of the outlet of the turboexpander, the inlet of the blower, and the inlet of the air compressor in order to recirculate a first amount of the expanded and cooled air back into the inlet of the air compressor after the first amount has exited the turboexpander.

10. The air conditioning system according to claim 9, wherein the air compressor is fluidly coupled between the recirculation conduit and the turbine wheel such that the first amount is configured to flow directly from the recirculation conduit into the inlet of the air compressor to be pressurized before flowing into and being boosted by the turbine wheel.

11. The air conditioning system according to claim 1, wherein the air conditioning system is a coolant-free air conditioning system.

12. The air conditioning system according to claim 1, being devoid of a combustion reaction involving burning of fuel.

13. A transportation system, comprising:
an electric motor;
at least one element coupled to and configured to be driven by the electric motor in order to move the transportation system between an IDLING state corresponding to the transportation system being turned on and not moving, and an OPERATING state corresponding to the transportation system being turned on and moving; and
an air conditioning system, comprising:
an air compressor comprising an air compressor motor configured to pull in ambient air and generate pressurized air from the ambient air;
a battery for powering the air compressor motor and the electric motor;
a generator electrically connected to the battery;
a blower; and
a turboexpander comprising:
a drive shaft coupled to the generator,
a turbine wheel coupled to the drive shaft and fluidly coupled to the air compressor such that the pressurized air from the air compressor is configured to be forced through a conduit extending between the air compressor and the turbine wheel, and into the turbine wheel, thereby providing a source of kinetic energy to directly cause the turbine wheel to rotate and generate boosted air from the pressurized air, and
an expander wheel coupled to the drive shaft and fluidly coupled to both the turbine wheel and the blower such that the boosted air from the turbine wheel is configured to be received in the expander wheel and directly cause the expander wheel and the drive shaft to rotate together with the turbine wheel, thereby generating expanded and cooled air in the expander wheel, wherein the turboexpander does not rotate due to a combustion reaction involving burning of fuel by an apparatus indirectly connected to the turboexpander via intermediate components, wherein the turboexpander does not rotate due to a combustion reaction involving burning of fuel by an apparatus directly connected to the turboexpander, wherein the expander wheel and the generator are configured to convert the source of kinetic energy to mechanical energy of the drive shaft, and then convert the mechanical energy of the drive shaft to electrical energy in the generator in order to generate electricity for charging the battery and thereby powering the air compressor motor and the electric motor, and wherein the blower is configured to receive the expanded and cooled air from the expander wheel and deliver the expanded and cooled air to an environment.

14. The transportation system according to claim 13, wherein the transportation system further has an OFF state corresponding to the transportation system being turned off and not moving, wherein the electric motor is configured to draw a first amount of power from the battery in order to move the transportation system from the OFF state to the IDLING state, wherein, when the transportation system is in the OPERATING state, the electric motor is configured to draw a second amount of power from the generator, and wherein, when the transportation system moves from the IDLING state to the OPERATING state, the first amount of power decreases as the second amount of power increases.

15. The transportation system according to claim 14, wherein the at least one element comprises a first axle and a second axle, wherein the transportation system further comprises a first pair of wheels coupled to the first axle, and a second pair of wheels coupled to the second axle, and wherein the electric motor is coupled to and configured to drive the first and second axles, thereby allowing the first and second pairs of wheels to roll when the transportation system is in the OPERATING state.

16. The transportation system according to claim 14, wherein, when the transportation system is in the OPERATING state, the first amount of power is configured to be less than the second amount of power.

17. The transportation system according to claim 13, wherein the air conditioning system further comprises a moisture separator and a carbon dioxide removal system, wherein the moisture separator is fluidly coupled to the conduit and is configured to remove moisture from the pressurized air before the pressurized air is delivered to the turbine wheel, thereby allowing the air conditioning system to generate the expanded and cooled air at a temperature below a freezing temperature of water, and wherein the carbon dioxide removal system is fluidly coupled to the conduit after the moisture separator and is configured to remove carbon dioxide from the pressurized air after the moisture has been removed by the moisture separator and before the pressurized air is delivered to the turbine wheel, thereby allowing the air conditioning system to generate the expanded and cooled air at a temperature below a freezing temperature of carbon dioxide.

18. The transportation system according to claim 13, wherein the turboexpander further comprises an outlet through which the expanded and cooled air exits the expander wheel, wherein the blower has an inlet for receiving the expanded and cooled air from the outlet of the turboexpander, wherein the air conditioning system further comprises a recirculation conduit fluidly coupled to each of the outlet of the turboexpander, the inlet of the blower, and the inlet of the air compressor in order to recirculate a first amount of the expanded and cooled air back into the inlet of the air compressor after the first amount has exited the turboexpander.

19. The transportation system according to claim 18, wherein the air compressor is fluidly coupled between the recirculation conduit and the turbine wheel such that the first amount is configured to flow directly from the recirculation conduit into the inlet of the air compressor to be pressurized before flowing into and being boosted by the turbine wheel.

* * * * *